(12) United States Patent
Wirkestrand

(10) Patent No.: US 6,408,339 B1
(45) Date of Patent: Jun. 18, 2002

(54) NON-PERMANENT ADDRESS ALLOCATION

(75) Inventor: Anders Wirkestrand, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/232,165

(22) Filed: Jan. 15, 1999

(30) Foreign Application Priority Data

Jan. 19, 1998 (GB) ............................................. 9801064

(51) Int. Cl.[7] ............................................. G06F 15/16
(52) U.S. Cl. ........................ 709/245; 709/200; 709/203; 709/226; 709/246; 370/230; 370/252; 370/393
(58) Field of Search ................................ 709/200–203, 709/220–222, 226–229, 238–242, 245–246; 713/200–201; 370/230–231, 252, 342–393, 401, 409

(56) References Cited

U.S. PATENT DOCUMENTS

| | | | |
|---|---|---|---|
| 5,535,336 A | 7/1996 | Smith et al. | 709/225 |
| 5,583,996 A | 12/1996 | Tsuchiya | 709/218 |
| 5,598,536 A | 1/1997 | Slaughter | 709/219 |
| 5,835,723 A | 11/1998 | Andrews et al. | 709/226 |
| 5,848,233 A | 12/1998 | Radia et al. | 713/201 |
| 6,009,103 A | 12/1999 | Woundy | 709/226 |
| 6,028,848 A | 2/2000 | Bhatia et al. | 370/257 |
| 6,070,187 A * | 5/2000 | Subramaniam et al. | 709/220 |
| 6,070,242 A * | 5/2000 | Wong et al. | 709/229 |
| 6,073,178 A * | 6/2000 | Wong et al. | 709/229 |
| 6,118,784 A | 9/2000 | Tsuchiya et al. | 370/401 |
| 6,147,986 A * | 11/2000 | Orsic | 709/349 |
| 6,195,688 B1 * | 2/2001 | Caldwell et al. | 709/208 |
| 6,240,464 B1 * | 5/2001 | Fijolek et al. | 709/238 |
| 6,321,250 B1 * | 11/2001 | Knape et al. | 709/203 |

FOREIGN PATENT DOCUMENTS

| | | |
|---|---|---|
| EP | 0605339 | 7/1994 |
| EP | 0691772 | 1/1996 |
| EP | 0781015 | 6/1997 |
| JP | 06-037752 | 2/1994 |
| JP | 07-066809 | 3/1995 |
| JP | 08-186569 | 7/1996 |
| JP | 08-194657 | 7/1996 |
| WO | 92/19059 | 10/1992 |
| WO | 94/22087 | 9/1994 |
| WO | 95/27342 | 10/1995 |
| WO | 96/39769 | 12/1996 |
| WO | 96/39770 | 12/1996 |
| WO | 97/02734 | 1/1997 |
| WO | 97/20413 | 6/1997 |
| WO | 97/21313 | 6/1997 |
| WO | 97/29584 | 8/1997 |

OTHER PUBLICATIONS

Shubert Foo, et al.; "Approaches for Resolving Dynamic IP Addressing", Internet Research: Electronic Networking Applications and Policy, vol. 7, No. 3, pp. 208–216, 1997.

* cited by examiner

Primary Examiner—Bharat Barot
(74) Attorney, Agent, or Firm—Burns, Doane, Swecker & Mathis, L.L.P.

(57) ABSTRACT

In a computer network used for the internet, computers are able to remain permanently connected to the network, without requiring addresses to be permanently allocated thereto. When a computer wishes to communicate with another computer, which has no address allocated thereto at that time, as determined by a server such as a domain name server, a message is sent to that computer, requiring it to request an address, using a dynamic host configuration protocol.

11 Claims, 2 Drawing Sheets

NON-PERMANENT ADDRESS ALLOCATION

TECHNICAL FIELD OF THE INVENTION

This invention relates to network operations, and in particular to the allocation of addresses in networks such as the internet.

BACKGROUND OF THE INVENTION

In order to be able to make a connection to an entity over a network, for example a computer network such as the internet, that entity must have an address allocated thereto. However, in some networks, the number of available addresses is smaller than the number which could be required.

To alleviate this problem, recognising the fact that many network users will only want to be connected to a network for a relatively small proportion of the time, internet addresses are typically allocated to a user temporarily. Such addresses can then be reallocated when a connection is terminated and, when the user wishes to reconnect, he will again receive an address, which is unlikely to be the same as before. In one variation of this widely used principle, WO96/39770 describes an address management system in which a user at a remote access device receives a username, and an internet protocol (IP) address. When the user disconnects, he loses the IP address, but, when he reconnects, he receives the same IP address as before.

However, this cannot solve difficulties caused by an excessively large number of users requiring permanent network connections, and hence permanently occupying network addresses. For the user, it may be advantageous to have a permanent connection, since this allows the user to be contacted by other entities, and also allows the user to resume activity, after a pause, without going through a lengthy dial-up process. In a network such as the internet, the number of available network addresses is insufficient to allow every user to occupy a network address permanently, particularly in view of the expected growth in the numbers of internet users.

SUMMARY OF THE INVENTION

In accordance with aspects of the invention, some of the problems caused by the limited availability of network addresses can be overcome. Specifically, aspects of the invention allow a user to obtain some of the benefits of a permanent network connection, without requiring the user to occupy an address permanently.

Specifically, in one aspect of the invention, a user may be in an idle connected state. In this state, the entity does not have an allocated network address but, in the event that another entity wishes to contact the first, an address is allocated thereto.

More particularly, in one aspect of the invention, when an entity wishes to reach a user in an idle connected state, the user can be forced to request a network address which can be used for the connection.

In a further aspect of the invention, there is preferably provided a server which contains a database of network addresses allocated to network users, the server having the ability, when it determines that a particular user has no address allocated thereto, to force that user to obtain an address.

DETAILED DESCRIPTION OF PREFERRED EMBODIMENTS

Figure 1:
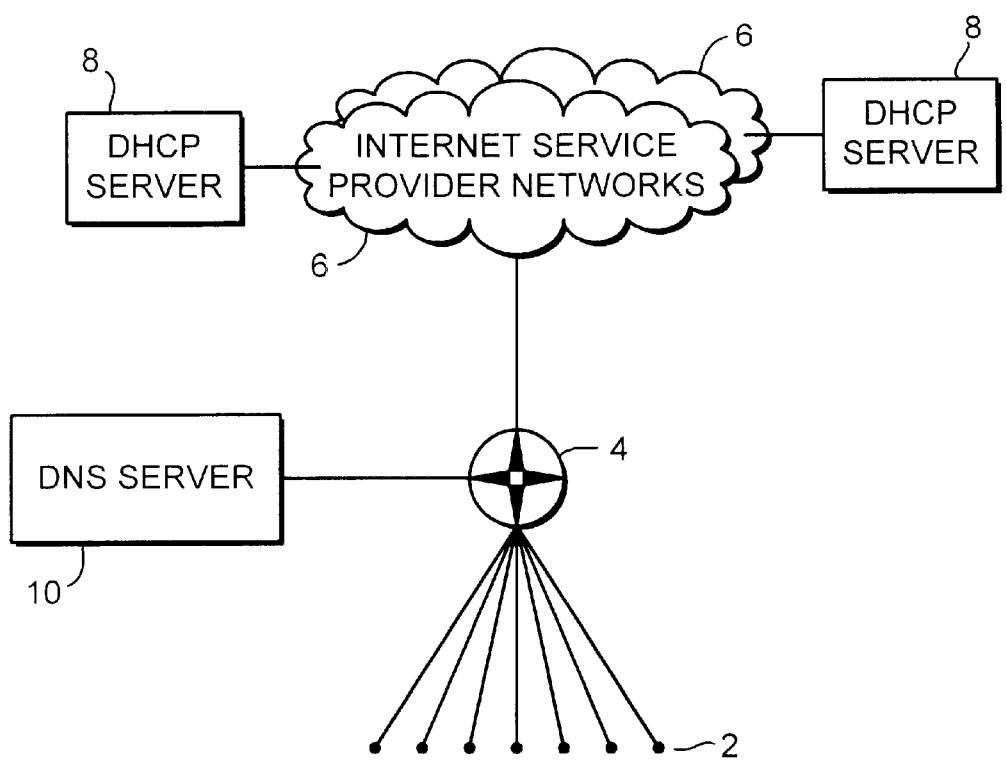
FIG. 1 is a schematic representation of a network embodying the invention.

FIG. 1 represents a network operating in accordance with the invention. For example, the network may be applied to the internet as currently operating. A large number of hosts 2 are connected to a network access server 4. In accordance with the invention, each host may remain permanently connected to the relevant network access server, thus avoiding the need for the user to dial in to the network when resuming activity after a pause. Nevertheless, the host has no address allocated to it when at times when it is inactive.

Each network access server 4 serves a number of internet service providers, giving internet access to a large number of users. The network access server (NAS) 4 is thus connected to the internet service provider networks 6. Of course, the network includes many such network access servers. Each internet service provider network 6 is connected to a respective address allocation server, in the case of the internet known as a dynamic host configuration protocol (DHCP) server 8. Moreover each network access server has an address storage server, in the case of the internet known as a domain name system (DNS) server 10 associated therewith.

When a host wishes to initiate a network connection, it must obtain a network address. This is achieved using the dynamic host configuration protocol, and requests an address from the relevant DHCP server 8.

When a user wishes to contact a host which it knows only by its name and domain, it performs a Domain Name System request of its local domain name system server. The request takes the form of an indication of the known name and domain, and the DNS server contains a database of host names and their corresponding addresses. Thus, the user is then able to contact the desired host.

Of course, if the desired host is not connected to the network, the DNS server will report that no address is allocated, and the sending user would not conventionally be able to contact the host.

In accordance with the preferred embodiment of the invention, the functionality of the DNS server is extended so that, in the event that the desired host has no allocated address, the DNS server will be able to initiate the allocation of an address thereto, thereby allowing the sending user to contact the host.

Figure 2:
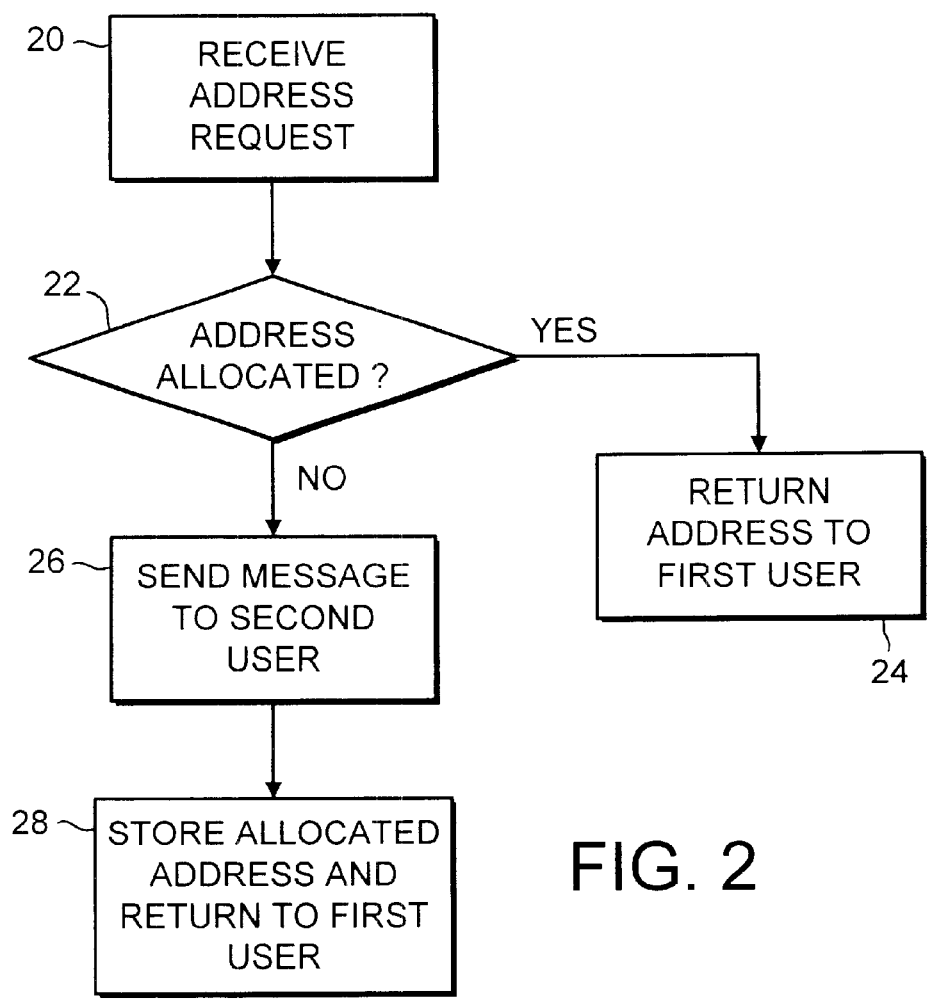
FIG. 2 is a flow chart illustrating a process carried out in a network access server in accordance with the invention.

FIG. 2 is a flow chart illustrating the procedure in the DNS server. In step 20 of the procedure, the DNS server receives a request for a network address from a first user, who wishes to contact a second user, but only knows that user's domain name, but not the relevant internet protocol address.

As mentioned above, the DNS server contains a database of allocated addresses and, in step 22 of the procedure, it examines that database, to find the address of the second user.

If an address has been allocated, the procedure passes to step 24 and, in a conventional way, the address is returned to the first user, which is therefore able to contact the first user.

On the other hand, if the second user is in an idle connected state, and thus has no internet address allocated thereto (branch "NO" from step 22), the procedure passes to step 26, in which a message is sent to the second user. This message forces the second user to send a dynamic host configuration protocol (DHCP) request to the relevant DHCP server to check out a network address. The relevant message can advantageously be a layer 2 defined standard message. When this message is received at a communication port of a host, the host starts its DHCP client, which makes the request to the DHCP server.

The second host computer sends the DHCP request in a conventional way, and an address is allocated to it. Also conventionally, this information is stored in the DNS server, which is then able to return the requested address to the first user (Step 28), which is therefore able to contact the second user.

It is also necessary to provide a mechanism whereby a user can lose an address allocated thereto, in order to allow efficient usage of the available addresses. The network address server 4 can monitor the users and, if a user is idle (that is, sends no traffic) for, say 10 minutes, the address can be withdrawn from the user. Alternatively, the user can send a signal to the network address server, relinquishing the address.

There is thus provided a system which allows the user to remain permanently connected to the network, and thus able to be contacted at all times, while only requiring a network address to be allocated thereto for that (possibly rather small) fraction of the time for which the address is required.

What is claimed is:

1. A method of operation of a computer network, the computer network comprising:

a plurality of computers, each of which have addresses allocated thereto when communicating with other computers in the computer network, and an address allocation server which allocates an address to a computer in response to a request therefrom, the method comprising:

allowing computers to remain connected to the network without having an address allocated thereto, and to allow a first computer to communicate with a second computer which has no address allocated thereto, sending a message to the second computer, requiring it to send an address allocation request to the address allocation server.

2. A method as claimed in claim 1, wherein the address allocation server is a DHCP server.

3. A method as claimed in claim 1, in a computer network comprising at least one address storage server which comprises a database of addresses allocated to users and which informs users or addresses allocated to other users in response to address information requests, the method comprising:

determining in response to an address information request from the first computer that the second computer has no address allocated thereto, and sending the message to the second computer from the address storage server.

4. A method as claimed in claim 3, wherein the address storage server is a DNS server.

5. A computer network, comprising:

a plurality of computers, each of which have addresses allocated thereto when communicating with other computers in the computer network, an address allocation server which allocates an address to a computer in response to a request therefrom, and at least one address storage server which comprises a database of addresses allocated to users and which informs users of addresses allocated to other users in response to address information requests, wherein, when the address storage server determines in response to an address information request from a first computer that a second computer has no address allocated thereto, it sends a message to the second computer requiring it to send an address allocation request to the address allocation server.

6. A computer network as claimed in claim 5, wherein the address allocation server is a DHCP server.

7. A computer network as claimed in claim 5, wherein the address storage server is a DNS server.

8. A method of operation of an address storage server including a database of addresses allocated to computers in a network, the method comprising:

examining the database in response to a request from a first computer to determine the network address of a second computer, and if it is determined that the second computer has no address allocated thereto, sending a message to the second computer which requires it to request an address allocation.

9. A method as claimed in claim 8, further comprising subsequently returning the allocated address to the first computer.

10. An address storage server, for use in a computer network which requires computers to have addresses allocated thereto to allow communication with other computers in the computer network, the address storage server comprising a database of addresses allocated to users and informing users of addresses allocated to other users in response to address information requests, wherein, when the address storage server determines in response to an address information request from a first computer that a second computer has no address allocated thereto, it sends a message to the second computer requiring it to request an address allocation.

11. An address storage server as claimed in claim 10, in the form of a DNS server.

* * * * *